Sept. 6, 1938.  A. F. WEGENER  2,129,513
FLEXIBLE MIRROR NOVELTY
Filed March 3, 1937
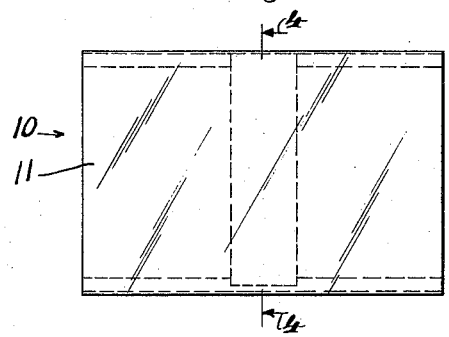
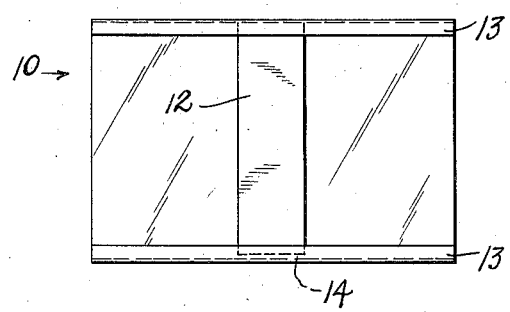
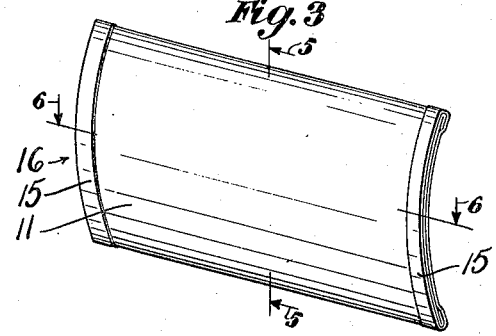
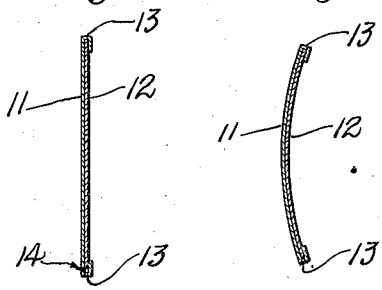
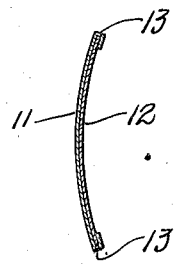
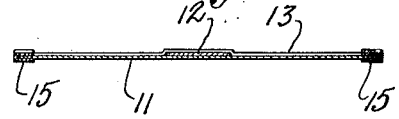
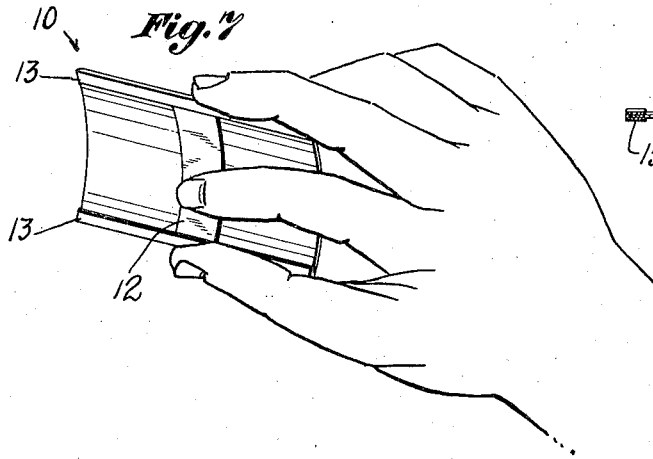
INVENTOR.
August F. Wegener
BY
ATTORNEY.

Patented Sept. 6, 1938

2,129,513

UNITED STATES PATENT OFFICE 2,129,513

FLEXIBLE MIRROR NOVELTY

August F. Wegener, Ridgewood, N. J.

Application March 3, 1937, Serial No. 128,764

1 Claim. (Cl. 88—105)

This invention relates to novelty devices of the mirror type.

One object of the invention is to provide an inexpensive mirror novelty which is adapted to be readily flexed to produce image distortion, and which will reliably spring back to initial position when released.

Another object of the invention is the provision of an improved device of the character described which shall be capable of wide and general use, as a toy, novelty or advertising adjunct, and which shall be adapted for quantity production, without expensive finishing operations, and which shall be durable, reliable and efficient in use and suitably restrained to prevent undue or excessive bending thereof.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated in the annexed drawing, wherein like parts are designated by the same reference characters throughout the several views.

In the drawing:

Figure 1 is a front view of a device embodying the invention; in plane position.

Fig. 2 is a similar rear view thereof.

Fig. 3 is an isometric front view of a modified form of the device in flexed condition.

Fig. 4 is a sectional view taken on the line 4—4 of Fig. 1.

Fig. 5 is a sectional view taken on the line 5—5 of Fig. 3.

Fig. 6 is a sectional view taken on the line 6—6 of Fig. 3.

Fig. 7 is an isometric rear view of the device showing the manner of flexing the same.

The advantages of the invention as here outlined are best realized when all of its features and instrumentalities are combined in one and the same structure, but, useful devices may be produced embodying less than the whole.

It will be obvious to those skilled in the art to which the invention appertains, that the same may be incorporated in several different constructions. The accompanying drawing, therefore, is submitted merely as showing the preferred exemplification of the invention.

Referring in detail to the drawing, 10 denotes a device embodying the invention. The same may include a plane flexible sheet or lamination of mirror material 11 having a resilient component or lamination such as a plane sheet of material 12 whose resilience is substantially greater than that of the material of the plate 11. With the latter constituting a face member, the plate 12 may act as a backing member associated therewith to permit the device 10 to be freely flexed and to spring back in a reliable manner to initial plane conditions upon release thereof. Hence the device 10 may be used to produce distorted images, for novel effects especially if a person uses the same as a mirror. Such a device is capable of being made and sold as an inexpensive novelty, and can be used as a toy, or given away as a souvenir, or used as an advertising novelty. It may be embodied in articles of widely varying sizes and shapes, and can be used as a part of different devices and constructions.

Although the laminations 11, 12 can consist of various materials, bonded or otherwise secured together, I prefer for the present to make both of them of separate metallic plates. For example, the face plate 11 may be made of nickel or chromium bonded to a zinc base or to a cold rolled steel base, or to a tin plate base, or to a brass base, or to a cold rolled copper base; or chromium bonded to a nickel silver base may be used; or other suitable materials. These materials, as a rule, have ample flexibility, but a relatively limited degree of resilience. The plate or backing member 12, on the contrary, may consist of spring steel, suitably heat treated for a high degree of resilience.

For securing together the plates 11 and 12 into a compact unit, the face member 11 may have opposed marginal lips 13, under which the end portions of the backing member 12 are inserted with the members lying in plane relation against each other. To facilitate the flexing action, at least one end of the backing spring is movable relative to its lip, a slight clearance being provided as at 14 between the end of the spring and the lip to facilitate the relative movement. It may suffice merely to slip the spring ends slidably under both of the lips 13 to obtain the desired securement. By extending the lips 13 throughout the length of the member 11, the corresponding edges of the latter are finished for smooth finger contact.

To provide a smooth finish for the remaining edges of the face member 11, so as to avoid the need for grinding, etc., of cut edges, I may fold and adhesively apply longitudinal strips 15 of a suitable flexible transparent sheet material that may be obtained in ribbon form. The strips 15 are relatively inconspicuous and do not affect the mirror area. These strips are shown in Figs. 3 and 6 as applied to a device 16 which is otherwise exactly like the device 10.

In operation, the user grasps the device 10 or 16, as shown in Fig. 7, with the fingers bearing against the edges or lips 13, and the index finger pressing centrally outward against the spring 12 to thus flex the device 10 as a unit, to produce the desired image distortion. The lips 13 serve to restrain the spring 12 at the ends thereof to prevent undue flexing and strain on the device.

If desired, the clearance space 14 may represent a resilient or yielding material such as rubber, leather, or composition material, which may be compressed by the adjacent end of the spring 12 acting as a piston, and with the plate 11 and the adjacent lip 13 functioning as a cylinder. In this manner the device such as 10 can be readily flexed and will be returned to perfectly plane position due to the lateral resilience of the spring 12 and the expandibility of the material at 14 acting longitudinally of the spring 12.

I claim:

A device including a plane flexible sheet metal structure having a plurality of laminations, one of the laminations having a mirror surface and having at opposite edge portions parallel lips folded toward each other and extending the full length of the mirrored lamination, the end edges of the latter being flexible so as not to retard flexing of the mirrored lamination about an axis parallel to and intermediate of said lips, the other lamination constituting a backing member having substantially greater resilience than the mirrored lamination, said backing member having its opposite edges received by said lips so as to normally lie flat against the mirrored lamination, said laminations being otherwise separate of each other and coacting with each other so that the laminated structure can be flexed as aforesaid to produce distorted images, with the backing member serving to return said structure to initial plane position.

AUGUST F. WEGENER.